United States Patent
Peng et al.

(10) Patent No.: US 12,482,008 B1
(45) Date of Patent: Nov. 25, 2025

(54) METHOD FOR QUERYING AND VERIFYING PLATFORM PRODUCT BASED ON DUAL ANTI-COUNTERFEITING CODE

(71) Applicant: CHINA COMMERCE NETWORKS (SHANGHAI) CO., LTD., Shanghai (CN)

(72) Inventors: Xiaolong Peng, Shanghai (CN); Heran Pang, Shanghai (CN); Xi Huang, Shanghai (CN)

(73) Assignee: CHINA COMMERCE NETWORKS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/974,092

(22) Filed: Dec. 9, 2024

(30) Foreign Application Priority Data

Sep. 30, 2024 (CN) .......................... 202411388588.2

(51) Int. Cl.
*G06Q 30/02* (2023.01)
*G06Q 30/018* (2023.01)

(52) U.S. Cl.
CPC ..... *G06Q 30/0185* (2013.01); *G06Q 2220/00* (2013.01)

(58) Field of Classification Search
CPC .......... G06Q 30/0185; G06Q 2220/00; G06Q 30/0207–30/0277
See application file for complete search history.

(56) References Cited

U.S. PATENT DOCUMENTS

2023/0074616 A1* 3/2023 Spivack ............. G06K 19/0723

FOREIGN PATENT DOCUMENTS

| CN | 107194449 B | * | 6/2017 |
|---|---|---|---|
| CN | 110503592 B | * | 8/2019 |
| CN | 111476334 A | * | 5/2020 |
| CN | 113076528 A | * | 3/2021 |
| CN | 115730622 A | * | 8/2021 |
| CN | 114330621 B | * | 11/2021 |
| CN | 114254719 B | * | 12/2021 |

(Continued)

OTHER PUBLICATIONS

Chen Fangfang; Cao Peng; {Research on Dual Anti Duplication and Anti-counterfeiting Technology of QR Code Based on Metamerism Characteristics}, dated Aug. 26, 2020 (https://ieeexplore.ieee.org/document/9177432?source=IQplus ).*

*Primary Examiner* — Thuy N Nguyen

(57) ABSTRACT

Provided is a method for querying and verifying a platform product based on a dual anti-counterfeiting code. The method includes: performing anti-counterfeiting encryption on a serial number or an ID of a platform product by using an encryption algorithm, and generating a unique identifier and an anti-counterfeiting URL; adding designated anti-counterfeiting information to the unique identifier by using a dot matrix generation algorithm of a micro dot code, to obtain a Star Map code; converting the anti-counterfeiting URL into a QR code and overlaying the Star Map code on the QR code to form a dual anti-counterfeiting code; scanning the dual anti-counterfeiting code to recognize a unique identifier in the QR code, and calling a star code recognition system; photographing the dual anti-counterfeiting code by using the star code recognition system, to recognize the unique identifier in the Star Map code.

10 Claims, 2 Drawing Sheets

(56) References Cited

FOREIGN PATENT DOCUMENTS

| CN | 114997350 A | * | 6/2022 |
| CN | 116681098 A | * | 6/2023 |
| CN | 117436907 B | * | 12/2023 |
| WO | WO 2012/136138 A1 | * | 10/2012 |
| WO | WO 2019/095172 A1 | * | 11/2017 |

* cited by examiner

METHOD FOR QUERYING AND VERIFYING PLATFORM PRODUCT BASED ON DUAL ANTI-COUNTERFEITING CODE

CROSS REFERENCE TO RELATED APPLICATION

This patent application claims the benefit and priority of Chinese Patent Application No. 202411388588.2, filed with the China National Intellectual Property Administration on Sep. 30, 2024, the disclosure of which is incorporated by reference herein in its entirety as part of the present application.

TECHNICAL FIELD

The present disclosure relates to the technical field of anti-counterfeiting verification, and in particular, to a method for querying and verifying a platform product based on a dual anti-counterfeiting code.

BACKGROUND

For a long time, counterfeit and substandard products have endangered the vital interests of enterprises and consumers, severely affecting the development of the market economy. To protect the interests of enterprises and consumers and ensure the healthy development of the market economy, a significant amount of human and financial resources is spent annually on anti-counterfeiting efforts. However, due to limitations in anti-counterfeiting technology and methods, as well as the lack of anti-counterfeiting tools for ordinary consumers, the effectiveness of anti-counterfeiting measures is not ideal.

In the prior art, two-dimensional code anti-counterfeiting involves printing or labeling two-dimensional codes on product packaging. Users can verify the authenticity of products and obtain detailed information by decoding and checking through a designated two-dimensional code anti-counterfeiting system or mobile software. Two-dimensional codes can store rich product information, which comes from official releases by enterprises, and the query channels are legitimate and professional, achieving the anti-counterfeiting effect of product information.

Currently, commonly used anti-counterfeiting two-dimensional codes are generally Quick Response (QR) codes. Ordinary QR codes are very easy to forge, and it is also difficult to distinguish between original and forged codes, which greatly inconveniences consumers in verifying the authenticity of products.

SUMMARY

An objective of the present disclosure is to provide a method for querying and verifying a platform product based on a dual anti-counterfeiting code, where a Star Map code is overlaid on a QR code, and through two anti-counterfeiting verifications, the security of platform product query verification is enhanced, thereby reducing the risk of anti-counterfeiting codes being copied.

To achieve the above objective, the present disclosure provides the following technical solution.

The present disclosure provides a method for querying and verifying a platform product based on a dual anti-counterfeiting code, which includes:

obtaining a serial number or an identity (ID) of a platform product;

performing anti-counterfeiting encryption on the serial number or the ID of the platform product by using an encryption algorithm, and generating a unique identifier and an anti-counterfeiting Uniform Resource Locator (URL);

adding designated anti-counterfeiting information to the unique identifier by using a dot matrix generation algorithm of a micro dot code, to obtain a Star Map code, where the anti-counterfeiting information includes: identification information and obfuscation information;

converting the anti-counterfeiting URL into a QR code and overlaying the Star Map code on the QR code to form a dual anti-counterfeiting code;

scanning the dual anti-counterfeiting code to recognize a unique identifier in the QR code, and calling a star code recognition system;

photographing the dual anti-counterfeiting code by using the star code recognition system, and recognizing the unique identifier in the Star Map code; and when information of the unique identifier in the QR code matches information of the unique identifier in the Star Map code, determining that the platform product is genuine, and an anti-counterfeiting verification is successful.

Optionally, said performing anti-counterfeiting encryption on the serial number or the ID of the platform product by using the encryption algorithm, and generating the unique identifier and the anti-counterfeiting URL specifically includes:

setting different meanings for numerical codes to form a standard anti-counterfeiting code rule;

generating a unique and non-repeating code from the serial number or the ID of the platform product based on the standard anti-counterfeiting code rule and performing encryption to obtain the unique identifier; and combining a link of the star code recognition system, the unique identifier, and a verification code to obtain the anti-counterfeiting URL.

Optionally, the standard anti-counterfeiting code rule includes at least: brand identification, time, platform product information, and a valid code length of a unique identifier segment.

Optionally, said adding the designated anti-counterfeiting information to the unique identifier by using the dot matrix generation algorithm of the micro dot code, to obtain the Star Map code specifically includes:

adding the designated identification information and obfuscation information to the unique identifier to obtain star code data; and converting the star code data into a designated dot matrix pattern to obtain the Star Map code.

Optionally, said scanning the dual anti-counterfeiting code to recognize the unique identifier in the QR code, and calling the star code recognition system specifically includes:

scanning the dual anti-counterfeiting code to obtain the anti-counterfeiting URL in the QR code; and parsing the anti-counterfeiting URL, and after the verification code passes validation, obtaining the unique identifier.

Optionally, said photographing the dual anti-counterfeiting code by using the star code recognition system, and recognizing the unique identifier in the Star Map code specifically includes:

capturing a clear Star Map code from the photographed dual anti-counterfeiting code;

parsing the Star Map code to obtain star code data; and
based on the star code data, parsing the identification
information and the obfuscation information to obtain
the unique identifier.

Optionally, the QR code is blue-green.

Optionally, the Star Map code is black or gray.

Optionally, the Star Map code has a resolution of at least 600 dpi.

Optionally, the Star Map code is in the following format: Bitmap Image File (BMP), Portable Document Format (PDF), or Drawing Exchange Format (DXF).

According to specific embodiments provided in the present disclosure, the present disclosure discloses the following technical effects:

In the present disclosure, a Star Map code is overlaid on the traditional QR code. The QR code and the Star Map code together form the dual anti-counterfeiting code for the platform product. The addition of the Star Map code necessitates a double-query method to verify the authenticity of the platform product. However, the methods for the two verifications of the dual anti-counterfeiting code are different; the second verification calls the star code recognition system based on the first scan, and then the star code recognition system is used to recognize the Star Map code. By comparing the results of the two verifications, the authenticity of the platform product can be determined. Although QR codes are easy to copy and forge, Star Map codes are generally difficult to replicate completely. Additionally, the present disclosure requires the use of the star code recognition system called by the QR code for secondary recognition, which is also difficult to forge. Therefore, the present disclosure effectively enhances the security of platform product query verification and reduces the risk of anti-counterfeiting codes being copied.

BRIEF DESCRIPTION OF THE DRAWINGS

To describe the technical solutions in the examples of the present disclosure or in the prior art more clearly, the following briefly describes the accompanying drawings required for the examples. Apparently, the accompanying drawings in the following description show merely some examples of the present disclosure, and a person of ordinary skill in the art may still derive other accompanying drawings from these accompanying drawings without creative efforts.

REFERENCE NUMERALS

Terminal—101; server—102.

DETAILED DESCRIPTION OF THE EMBODIMENTS

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method for querying and verifying a platform product based on a dual anti-counterfeiting code, where a Star Map code is overlaid on a QR code, and through two anti-counterfeiting verifications, the security of platform product query verification is enhanced, thereby reducing the risk of anti-counterfeiting codes being copied.

To make the above objectives, features, and advantages of the present disclosure more obvious and easy to understand, the present disclosure will be further described in detail with reference to the accompanying drawings and specific implementations.

Figure 1:
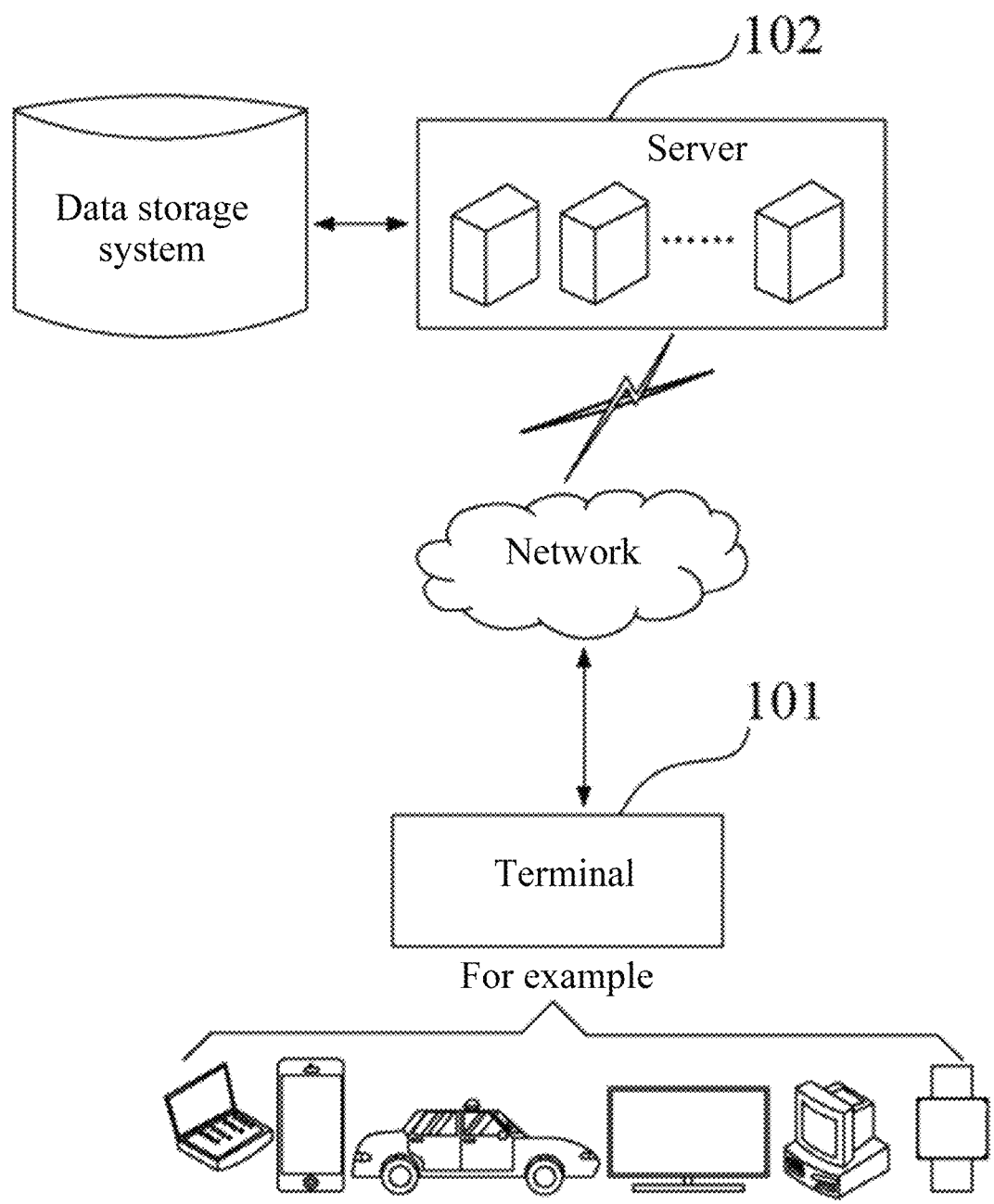
FIG. 1 is a diagram of an application environment of a method for querying and verifying a platform product based on a dual anti-counterfeiting code according to an embodiment of the present disclosure.

A method for querying and verifying a platform product based on a dual anti-counterfeiting code provided by an embodiment of the present disclosure can be applied to the application environment shown in FIG. 1. A terminal 101 communicates with a server 102 via a network. A data storage system can store data that the server 102 needs to process. The data storage system can be independently set up, integrated with the server 102, or placed in the cloud or on other servers. The terminal 101 can send a serial number or an ID (which can also be a dual anti-counterfeiting code) of a platform product to the server 102. Upon receiving the serial number or ID (which can also be the dual anti-counterfeiting code) of the platform product, the server 102 performs anti-counterfeiting encryption on the serial number or ID of the platform product by using an encryption algorithm, and generates a unique identifier and an anti-counterfeiting Uniform Resource Locator (URL); a designated anti-counterfeiting information is added to the unique identifier by using a dot matrix generation algorithm of a micro dot code, to obtain a Star Map code; the anti-counterfeiting URL is converted into a QR code, and the Star Map code is overlaid on the QR code to form a dual anti-counterfeiting code; a unique identifier in the QR code is recognized, and a star code recognition system is called; the unique identifier in the Star Map code is recognized; when information of the unique identifier in the QR code matches information of the unique identifier in the Star Map code, it is determined that the platform product is genuine, and an anti-counterfeiting verification is successful. The server 102 can feedback the obtained result (i.e., the platform product is genuine, and the anti-counterfeiting verification is successful) to the terminal 101. Additionally, in some embodiments, the method for querying and verifying a platform product based on a dual anti-counterfeiting code can also be implemented solely by the server 102 or the terminal 101.

The terminal 101 can be, but is not limited to, various desktop computers, laptops, smartphones, tablets, Internet of Things (IoT) devices, and portable wearable devices. The IoT device may be a smart speaker, a smart TV, a smart air conditioner, a smart in-vehicle device, or the like. The portable wearable device can be a smart watch, a smart band, a head-mounted device, or the like. The server 102 can be implemented using a standalone server, a server cluster consisting of a plurality of servers, or a cloud server.

Figure 2:
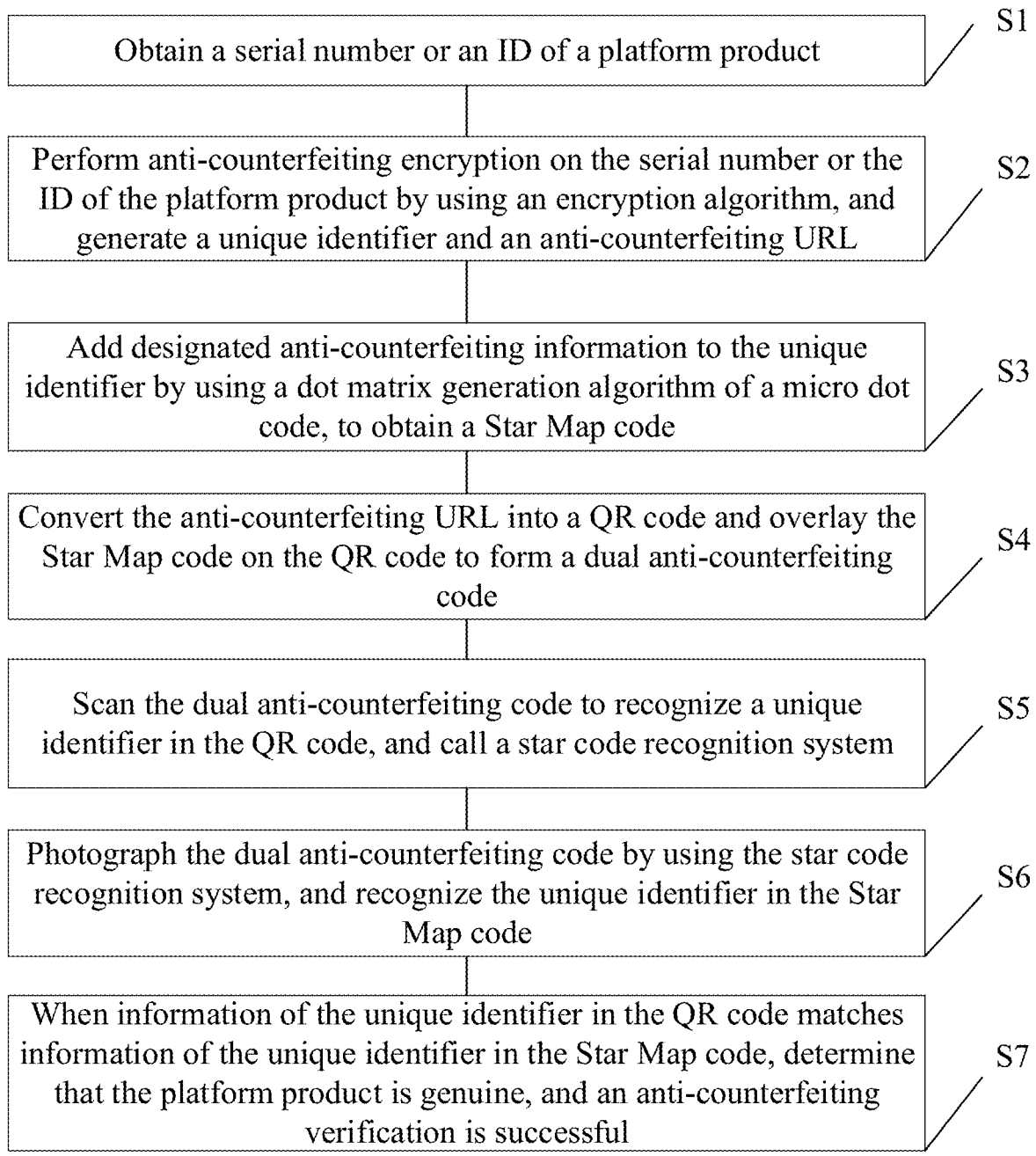
FIG. 2 is a flowchart of a method for querying and verifying a platform product based on a dual anti-counterfeiting code according to an embodiment of the present disclosure.

In an exemplary embodiment, as shown in FIG. 2, a method for querying and verifying a platform product based on a dual anti-counterfeiting code is provided, which is executed by a computer device. Specifically, the method can be executed independently by a computer device such as a terminal or a server, or jointly executed by a terminal and a server. In the embodiment of the present disclosure, the method being applied to the server 102 in FIG. 1 is taken as an example for description, including the following steps S1 to S3:

Step S1: Obtain a serial number or an ID of a platform product.

Step S2: Perform anti-counterfeiting encryption on the serial number or the ID of the platform product by using an encryption algorithm, and generate a unique identifier and an anti-counterfeiting URL.

In a preferred implementation, step S2 specifically includes:

Step S21: Set different meanings for numerical codes to form a standard anti-counterfeiting code rule. For example: brand identification is represented by a 2-digit numerical code, time is represented by an 8-digit numerical code, platform product information (name, model, etc.) is represented by a 3-digit numerical code, and a unique identifier segment is represented by a 12-digit numerical code.

Step S22: Generate a unique and non-repeating code from the serial number or the ID of the platform product based on the standard anti-counterfeiting code rule and perform encryption to obtain the unique identifier.

Step S23: Combine a link of the star code recognition system (mainly used to recognize Star Map codes, which are personalized fixed values), the unique identifier, and a verification code to obtain the anti-counterfeiting URL.

Step S3: Add designated anti-counterfeiting information to the unique identifier by using a dot matrix generation algorithm of a micro dot code, to obtain a Star Map code. The anti-counterfeiting information includes: identification information and obfuscation information. In a preferred implementation, step S3 specifically includes:

Step S31: Add the designated identification information and obfuscation information to the unique identifier to obtain star code data.

Step S32: Convert the star code data into a designated dot matrix pattern to obtain the Star Map code. The Star Map code is in the following format: BMP, PDF, or DXF.

Step S4: Convert the anti-counterfeiting URL into a QR code and overlay the Star Map code on the QR code to form a dual anti-counterfeiting code In a preferred implementation, using printing software that comes with a printer, the anti-counterfeiting URL can be converted into a QR code. During actual printing, the QR code is printed on the bottom layer, and the Star Map code is printed on the QR code. Additionally, to facilitate recognition of the QR code and the Star Map code, special treatment is required for printed colors, specifically controlling the Cyan Magenta Yellow Key black (CMYK) color range of the QR code as follows: C (50~200), M (5~100), Y (50~200), which is generally blue-green, while the Star Map code is printed in black or gray. Furthermore, to enhance the recognition effect of the Star Map code, it is recommended to use a minimum resolution of 600 dpi or higher when printing the Star Map code.

Step S5: Scan the dual anti-counterfeiting code to recognize a unique identifier in the QR code, and call a star code recognition system.

In a preferred implementation, step S5 specifically includes:

Step S51: Scan the dual anti-counterfeiting code to obtain the anti-counterfeiting URL in the QR code. An APP with a scanning function (such as WeChat, a browser, etc.) can be used for the first scan of the dual anti-counterfeiting code.

Step S52: Parse the anti-counterfeiting URL, and after the verification code passes validation, obtain the unique identifier.

Step S6: Photograph the dual anti-counterfeiting code by using the star code recognition system, and recognize the unique identifier in the Star Map code.

In a preferred implementation, step S6 specifically includes:

Step S61: Capture a clear Star Map code from the photographed dual anti-counterfeiting code.

Step S62: Parse the Star Map code to obtain star code data.

Step S63: Based on the star code data, parse the identification information and the obfuscation information to obtain the unique identifier.

Step S7: When information of the unique identifier in the QR code matches information of the unique identifier in the Star Map code, determine that the platform product is genuine, and an anti-counterfeiting verification is successful.

In summary, the present disclosure combines the dot matrix code technology with the anti-counterfeiting technology to achieve the anti-copying characteristics of QR codes, providing enterprises with a higher level of anti-counterfeiting protection. Additionally, the present disclosure employs two anti-counterfeiting verifications to enhance the security of the anti-counterfeiting validation.

Each embodiment in the description is described in a progressive mode, each embodiment focuses on differences from other embodiments, and references can be made to each other for the same and similar parts between embodiments.

Several examples are used herein for illustration of the principles and implementations of the present disclosure. The description of the foregoing examples is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A method for querying and verifying a platform product based on a dual anti-counterfeiting code, comprising:
    obtaining a serial number or an identity (ID) of a platform product;
    performing anti-counterfeiting encryption on the serial number or the ID of the platform product by using an encryption algorithm, and generating a unique identifier and an anti-counterfeiting Uniform Resource Locator (URL);
    adding designated anti-counterfeiting information to the unique identifier by using a dot matrix generation algorithm of a micro dot code, to obtain a Star Map code, wherein the anti-counterfeiting information comprises: identification information and obfuscation information;
    converting the anti-counterfeiting URL into a Quick Response (QR) code and overlaying the Star Map code on the QR code to form a dual anti-counterfeiting code;
    scanning the dual anti-counterfeiting code to recognize a unique identifier in the QR code, and calling a star code recognition system;
    photographing the dual anti-counterfeiting code by using the star code recognition system, and recognizing the unique identifier in the Star Map code; and
    when information of the unique identifier in the QR code matches information of the unique identifier in the Star Map code, determining that the platform product is genuine, and an anti-counterfeiting verification is successful.

2. The method for querying and verifying a platform product based on a dual anti-counterfeiting code according to claim 1, wherein said performing anti-counterfeiting encryption on the serial number or the ID of the platform product by using the encryption algorithm, and generating the unique identifier and the anti-counterfeiting URL specifically comprises:
   setting different meanings for numerical codes to form a standard anti-counterfeiting code rule;
   generating a unique and non-repeating code from the serial number or the ID of the platform product based on the standard anti-counterfeiting code rule and performing encryption to obtain the unique identifier; and
   combining a link of the star code recognition system, the unique identifier, and a verification code to obtain the anti-counterfeiting URL.

3. The method for querying and verifying a platform product based on a dual anti-counterfeiting code according to claim 2, wherein the standard anti-counterfeiting code rule comprises at least: brand identification, time, platform product information, and a valid code length of a unique identifier segment.

4. The method for querying and verifying a platform product based on a dual anti-counterfeiting code according to claim 1, wherein said adding the designated anti-counterfeiting information to the unique identifier by using the dot matrix generation algorithm of the micro dot code, to obtain the Star Map code specifically comprises:
   adding the designated identification information and obfuscation information to the unique identifier to obtain star code data;
   converting the star code data into a designated dot matrix pattern to obtain the Star Map code.

5. The method for querying and verifying a platform product based on a dual anti-counterfeiting code according to claim 2, wherein said scanning the dual anti-counterfeiting code to recognize the unique identifier in the QR code, and calling the star code recognition system specifically comprises:
   scanning the dual anti-counterfeiting code to obtain the anti-counterfeiting URL in the QR code; and
   parsing the anti-counterfeiting URL, and after the verification code passes validation, obtaining the unique identifier.

6. The method for querying and verifying a platform product based on a dual anti-counterfeiting code according to claim 4, wherein said photographing the dual anti-counterfeiting code by using the star code recognition system, and recognizing the unique identifier in the Star Map code specifically comprises:
   capturing a clear Star Map code from the photographed dual anti-counterfeiting code;
   parsing the Star Map code to obtain star code data; and
   based on the star code data, parsing the identification information and the obfuscation information to obtain the unique identifier.

7. The method for querying and verifying a platform product based on a dual anti-counterfeiting code according to claim 1, wherein the QR code is blue-green.

8. The method for querying and verifying a platform product based on a dual anti-counterfeiting code according to claim 1, wherein the Star Map code is black or gray.

9. The method for querying and verifying a platform product based on a dual anti-counterfeiting code according to claim 1, wherein the Star Map code has a resolution of at least 600 dpi.

10. The method for querying and verifying a platform product based on a dual anti-counterfeiting code according to claim 1, wherein the Star Map code is in the following format: Bitmap Image File (BMP), Portable Document Format (PDF), or Drawing Exchange Format (DXF).

\* \* \* \* \*